July 6, 1948.

N. H. NYE ET AL 2,444,523

APPARATUS FOR SURFACE CONDITIONING WIRES AND THE LIKE

Filed April 19, 1944

INVENTORS
NORMAN H. NYE and
WALTER E. ROGERS

BY Oberlin, Limbach & Day
ATTORNEYS

July 6, 1948.   N. H. NYE ET AL   2,444,523
APPARATUS FOR SURFACE CONDITIONING
WIRES AND THE LIKE
Filed April 19, 1944   7 Sheets-Sheet 2

INVENTORS
NORMAN H. NYE and
WALTER E. ROGERS
BY
Oberlin, Limbach & Day
ATTORNEYS July 6, 1948.  N. H. NYE ET AL  2,444,523
APPARATUS FOR SURFACE CONDITIONING
WIRES AND THE LIKE
Filed April 19, 1944  7 Sheets-Sheet 3

INVENTORS
NORMAN H. NYE and
WALTER E. ROGERS
BY
Oberlin, Limbach & Day.
ATTORNEYS July 6, 1948. N. H. NYE ET AL 2,444,523
APPARATUS FOR SURFACE CONDITIONING
WIRES AND THE LIKE
Filed April 19, 1944 7 Sheets-Sheet 4

INVENTORS
NORMAN H. NYE and
WALTER E. ROGERS
BY
Oberlin, Limbach & Day.
ATTORNEYS July 6, 1948.                N. H. NYE ET AL                    2,444,523
                    APPARATUS FOR SURFACE CONDITIONING
                              WIRES AND THE LIKE
Filed April 19, 1944                                      7 Sheets-Sheet 5

INVENTORS
NORMAN H. NYE and
WALTER E. ROGERS
BY
Oberlin, Limbach & Day.
ATTORNEYS

Fig. 8

INVENTORS
NORMAN H. NYE and
WALTER E. ROGERS
By—
Oberlin, Limbach & Day
ATTORNEYS

UNITED STATES PATENT OFFICE 2,444,523

APPARATUS FOR SURFACE CONDITIONING WIRES AND THE LIKE

Norman H. Nye, Cuyahoga Falls, and Walter E. Rogers, Stow, Ohio, assignors to The Vaughn Machinery Company, Cuyahoga Falls, Ohio, a corporation of Ohio Application April 19, 1944, Serial No. 531,722

10 Claims. (Cl. 51—112)

The present improvements, relating as indicated to apparatus for surface conditioning wire and the like, have more particular regard to means for carrying out such an operation on a continuously travelling length of wire.

The present invention in effect constitutes an improvement in the apparatus disclosed in the co-pending application of N. H. Nye and E. J. McIlvried, filed April 10, 1942, Serial No. 438,454 (now Patent No. 2,355,174, dated August 8, 1944), in which a length of continuously moving wire or similar elongated work-piece is rapidly torsionally oscillated about its axis while grinding or equivalent mechanical surface conditioning means are caused to contact with such oscillating portion or length of the wire. The method of operation thus exemplified presents marked advantages over the familiar method of stationary polishing wire or other elongated work-pieces of cylindrical cross-section, where the grinding or polishing means are rotated about the work-piece. While it has been proposed to rotate such work-piece between relatively substantially polishing or grinding means, this is not particularly practicable where the work-piece is in the form of a continuously travelling strand since it involves rotating both the drum or reel from which the strand is drawn and that on which it is wound. The advantages in torsionally oscillating a section of the travelling strand between the supply and take-up means are fully pointed out in the aforesaid co-pending application.

One principal object of the present invention is to provide improved means for thus oscillating the travelling strand of wire or equivalent work-piece while in contact with suitable mechanical surface conditioning means. Among other things sought to be accomplished in this connection is automatic correlation of the rate of travel of the wire and the rate of oscillation thereof as well as the avoidance so far as possible of reciprocating parts which at high rates of speed necessarily involve considerable wear and tear of such parts.

Another object is to provide an improved construction and arrangement of grinding wheels which constitute the preferred mechanical surface conditioning means employed in connection with such oscillating means. Provision is also included for close adjustment of such grinding wheels so as to ensure a uniform and accurately dimensioned product. To this end improved means are also provided for dressing the grinding surfaces of such wheels without interrupting the operation.

To the accomplishment of the foregoing and related ends, said invention, then, consists of the means hereinafter fully described and particularly pointed out in the claims, the annexed drawings and the following description setting forth in detail certain means and one mode of carrying out the invention, such disclosed means and mode illustrating, however, but one of various ways in which the principle of the invention may be used.

Figure 1:
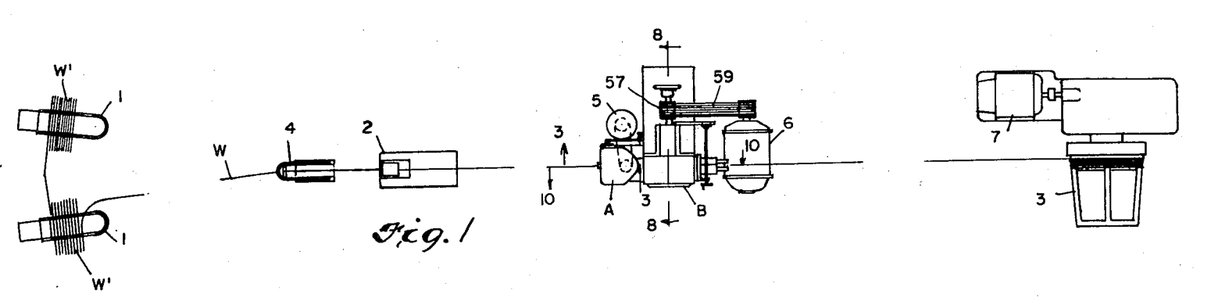
Fig. 1 is a plan view more or less diagrammatic in character illustrating our improved surface conditioning apparatus as associated with a wire drawing mechanism.
Figure 2:
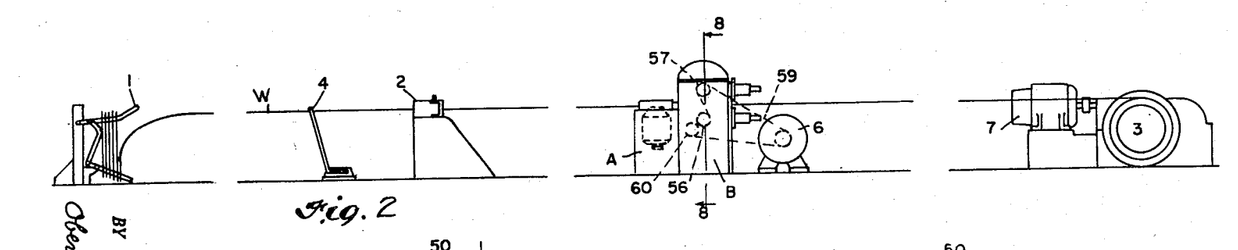
Fig. 2 is a side elevational view of the same.
Figures 3, 3A:
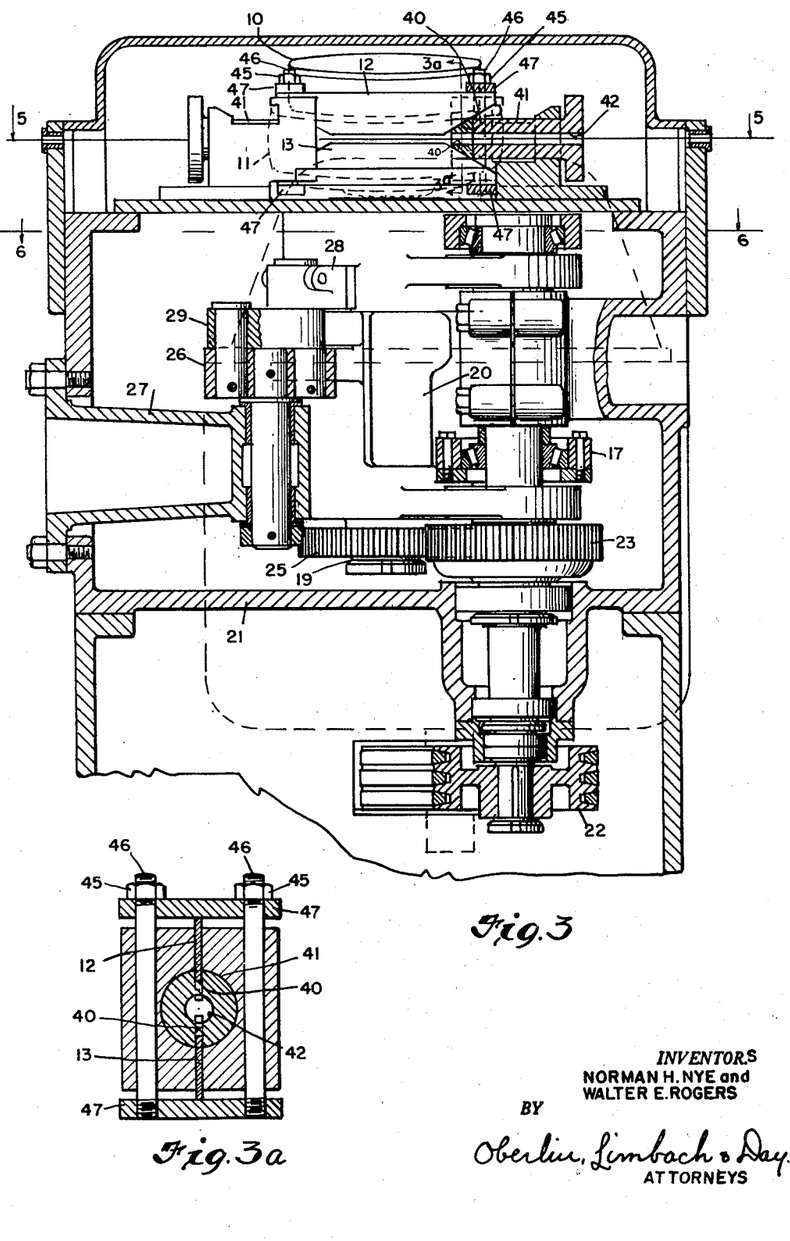
Fig. 3 is a vertical section of that portion of the apparatus which imparts oscillatory movement to the continuously advancing wire strand, the plane of such section being indicated by the line 3—3 Fig. 1.
Fig. 3a is a sectional view of a detail of such oscillating mechanism, the plane of such section being indicated by the line a—a Fig. 3.

As indicated in the foregoing general description of the drawings, our improved surface conditioning mechanism is there shown in association with a wire drawing mechanism. The latter may be an adaptation of any approved type of conventional draw bench, it being understood that the term "wire" is herein used to connote any elongated form of round stock or rod such as is capable of being handled by such conventional draw bench. Ordinarily the stock, e. g., rod or wire W, will be received in the form of a coil W' on a suitable reel from which it may be unwound as required, or preferably on one or the other of two so-called flippers 1, so arranged that the tag end of one coil W' may be welded or otherwise attached to the leading end of the second coil so as to maintain the wire in continuous supply for passage through the conventional drawing mechanism as well as through the associated surface conditioning apparatus which constitutes the present invention. Of such drawing mechanism the only parts illustrated comprise a die 2 and a power driven take-up reel or winding drum 3. There is also shown in Figs. 1 and 2, in advance of die 2, the usual guide and snarl switch 4, the function of which is to lead the wire in a straight line to the die irrespective of from which reel or flipper 1 it is being drawn; also to shut off power to the winding drum 3 in case a snarl or tangle should occur in the wire as it is thus taken from the supply.

The apparatus of present interest comprises two closely related mechanisms, viz. a mechanism or device A for torsionally oscillating the length or portion of the wire W which lies between die 2 and drawing drum 3 and a mechanism or device B for mechanically surface conditioning such wire as it thus continuously advances from supply to take-up and is simultaneously oscillated by device A. Preferably the wire oscillating device A will be driven by an electric motor 5 and surface conditioning mechanism B by independent motor 6. However these motors, along with motor 7 which drives the take-up reel or winding drum 3, will desirably all be connected with the same source of power which is controlled by the snarl switch 4 so that all the several mechanisms involved may be shut down simultaneously. The description of such wire oscillating device and surface conditioning mechanism will now follow in order.

The essenital elements of the oscillating mechanism or device (best shown in Fig. 7) are two opposed wobble rolls 10 and 11 having transversely convex faces between which the wire W as it advances is gripped; two guide plates 12 and 13 being inserted in the space between said rolls to insure the proper alignment of the advancing wire.

Figures 4, 11, 12:
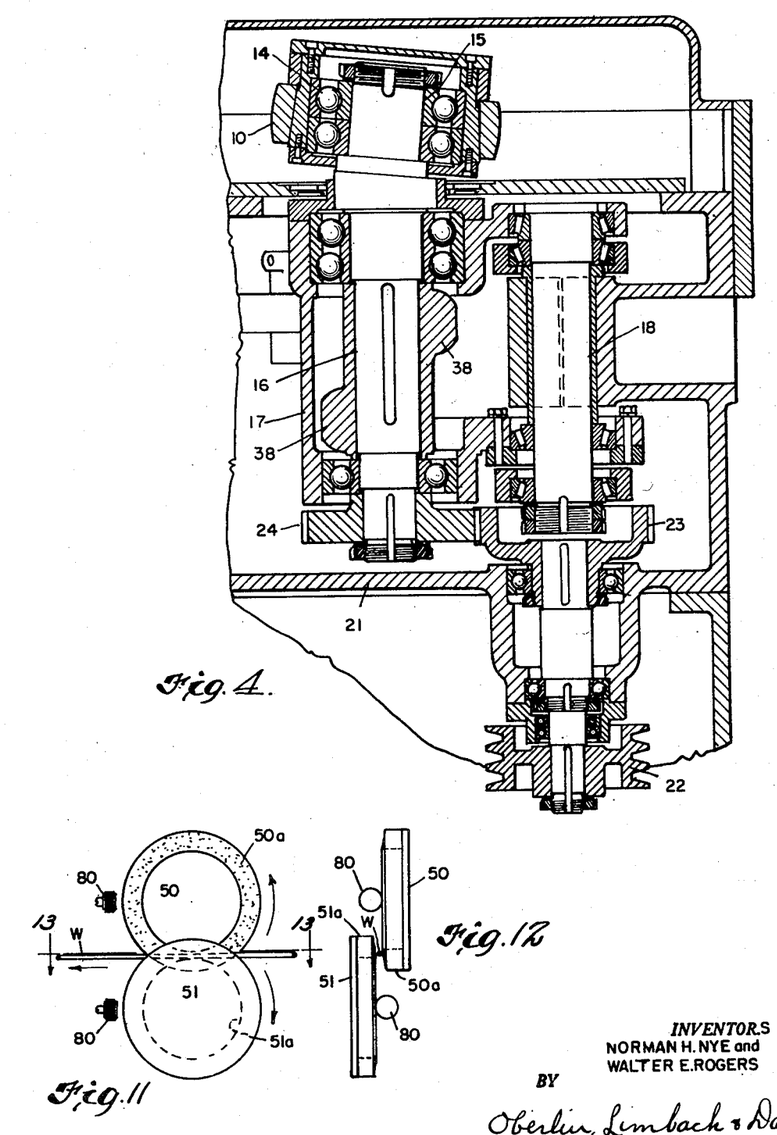
Fig. 4 is a vertical sectional view of such oscillating mechanism similar to that of Fig. 3 but taken on an angularly related plane.
Fig. 11 is a diagrammatic side elevation of the two grinding wheels showing the wire that is being ground passing therebetween and also showing the rotary cutters which constitute part of such dressing mechanism.
Fig. 12 is an end view of such grinding wheels and associated parts.
Figure 5:
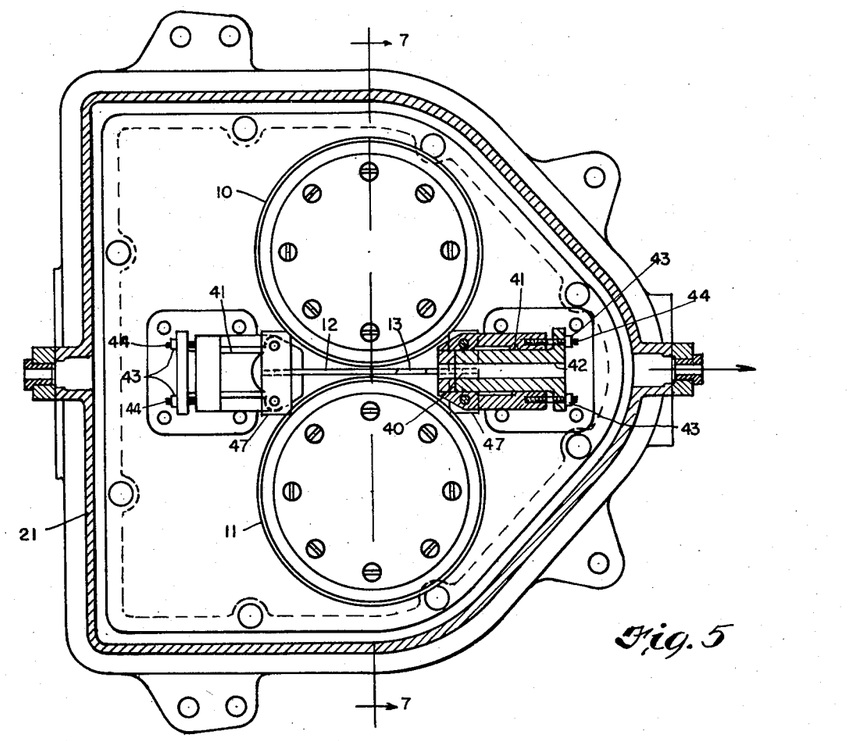
Fig. 5 is a top plan view of such oscillating mechanism with certain associated parts shown in section, the plane of such section being indicated by the line 5—5 Fig. 3.
Figure 6:
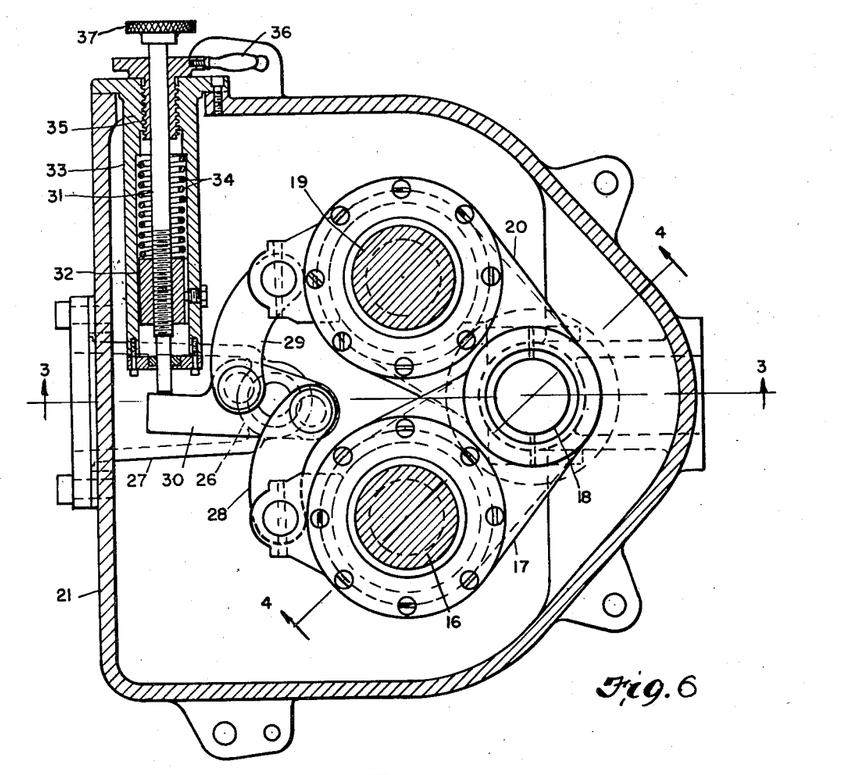
Fig. 6 is another transverse section of such oscillating mechanism taken on a somewhat lower plane, as indicated by the line 6—6 Fig. 3.

The detailed construction of the rolls 10 and 11 and of their mounting is shown in Figs. 3 to 6 inc. While a full sectional view of only one such roll (viz., roll 10) and mounting is shown, it will be understood that the construction and mounting of roll 11 is identical therewith. Referring more particularly to Fig. 4 which presents a full sectional view of roll 10 and its mounting, such roll is mounted for free rotation through the medium of anti-friction bearings 14 on the inclined stub end 15 of a shaft 16. The latter is in turn journalled in a carrier 17 swingably supported upon a shaft 18, the spindle 19 which carries the companion wobble roll 11 being journalled in a similar carrier 20 likewise swingable about shaft 18. Said shaft 18 is journalled in suitable bearings in the main frame or housing 21 of the oscillating mechanism, one end of such shaft projecting without such frame and being provided with a drive pulley 22 for belt connection with the motor 5 whereby the mechanism is operated. Fixed on shaft 18 within the main frame or housing 21 is a gear 23 that meshes with gears 24 and 25 on the lower ends of spindles 16 and 19 respectively. Since any swinging movement of the carriers 17 and 20 in which said spindles are journalled will be in a circle concentric with the axis of shaft 18, the gears just referred to will at all times remain in mesh, and rotation of said shaft will be effective to rotate said spindles together with their inclined ends and the wobble rolls mounted thereon. Furthermore, such spindles will be relatively so disposed that their inclined ends always incline in the same direction as they thus rotate.

Means are provided for swinging the carriers 17 and 20 in order to adjust the space between the opposed wobble rolls so that the latter will properly grip a wire of given diameter. Such means comprise a rocker 26 journalled in a bracket 27 that projects inwardly from the main frame or housing 21 so as to support such rocker between the two carriers with which the rocker is respectively connected by means of links 28 and 29. Projecting outwardly from the rocker is an arm 30 wherewith the inner end of an adjusting screw or rod 31 contacts. The latter is threaded in a nut 32, slidably but non-rotatably held within a housing 33 against a compression spring 34. Accordingly whatever the adjusted position of the threaded rod 31 in nut 32, the pressure exerted thereby through arm 30 on rocker 26 will be yieldable to the extent that spring 34 is compressible. In order to enable the wobble rolls to be separated, as in setting up the machine for operation, the threaded rod 31 may be withdrawn by means of a coarse threaded nut 35 in the outer end of housing 33 which upon rotation by means of handle 36 engages and lifts the knurled knob 37 on the outer end of said rod.

Figure 7:
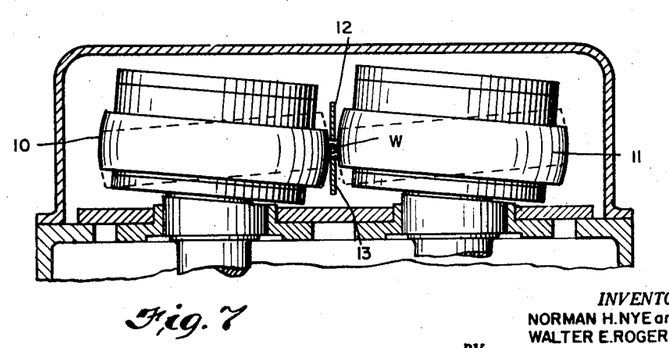
Fig. 7 is a side elevation of the pair of wobble rolls which constitute a part of such oscillating mechanism with certain associated parts shown in section, the plane of such section being indicated by the line 7—7 Fig. 5.

It will be understood that the only effect of rotating shaft 18, and therethrough the spindles 16 and 19 which carry the respective wobble rolls 10 and 11, will be correspondingly to rotate the inclined ends of said rolls and thus change the angle of inclination of the rolls towards each other, rotation of the rolls themselves about such spindle ends being produced by frictional engagement of such advancing wire with the contacting faces of such rolls. As shown in Fig. 7, the relative disposition of such angular spindle ends and the convexity of their wire engaging faces is such that the wire will be rolled therebetween without its longitudinal alignment being disturbed. There will also be practically no restraint imposed on the longitudinal movement of the wire since the anti-friction bearings of the rolls provide for free rotative movement thereof.

It will be further understood that the degree of inclination of the spindle ends which carry the wobble rolls and the transverse extent of the convex faces of the latter will be such as to cause oscillation of the wire gripped between the rolls through at least 180° and preferably a little more so as to insure contact of the entire periphery of the advancing wire with the grinding means presently to be described. The rate at which the spindles which carry the wobble rolls are driven will likewise be such as to cause oscillation of the wire at such frequency as will insure engagement of its entire surface with said grinding means. Since such rate of rotation may require to be quite rapid, we have found it desirable to apply suitable spaced counterweights 38 on said spindles so as to balance the off-center disposition of the wobble rolls carried thereby.

As previously noted, guides 12 and 13 are provided in order to insure the retention of the wire in proper location between the opposed wobble rolls. These guides (see Figs. 3, 3a, 5 and 7) take the form of two pairs of plates of less thickness than the wire so as to not come in contact with the rolls. Such plates are oppositely bevelled at their respective ends to engage with correspondingly inclined seats 40 in adjustable slides 41, the latter being provided with central apertures 42 for the free passage of the wire therethrough. Inward movement of slides 41 is effected by drawing up nuts 43 on bolts 44 and the degree of separation of the plates 12 and 13 is controlled by nuts 45 on bolts 46 which are adapted to draw together tie bars 47 disposed transversely of said plates. Actually the adjustment of the latter is effected by simultaneously or alternately turning the nuts 45 and the nuts 43 until the inner edges of the plates are in parallel relation and spaced the desired distance apart. Tightening of the nuts in question will then securely retain such plates in such position.

Figure 8:
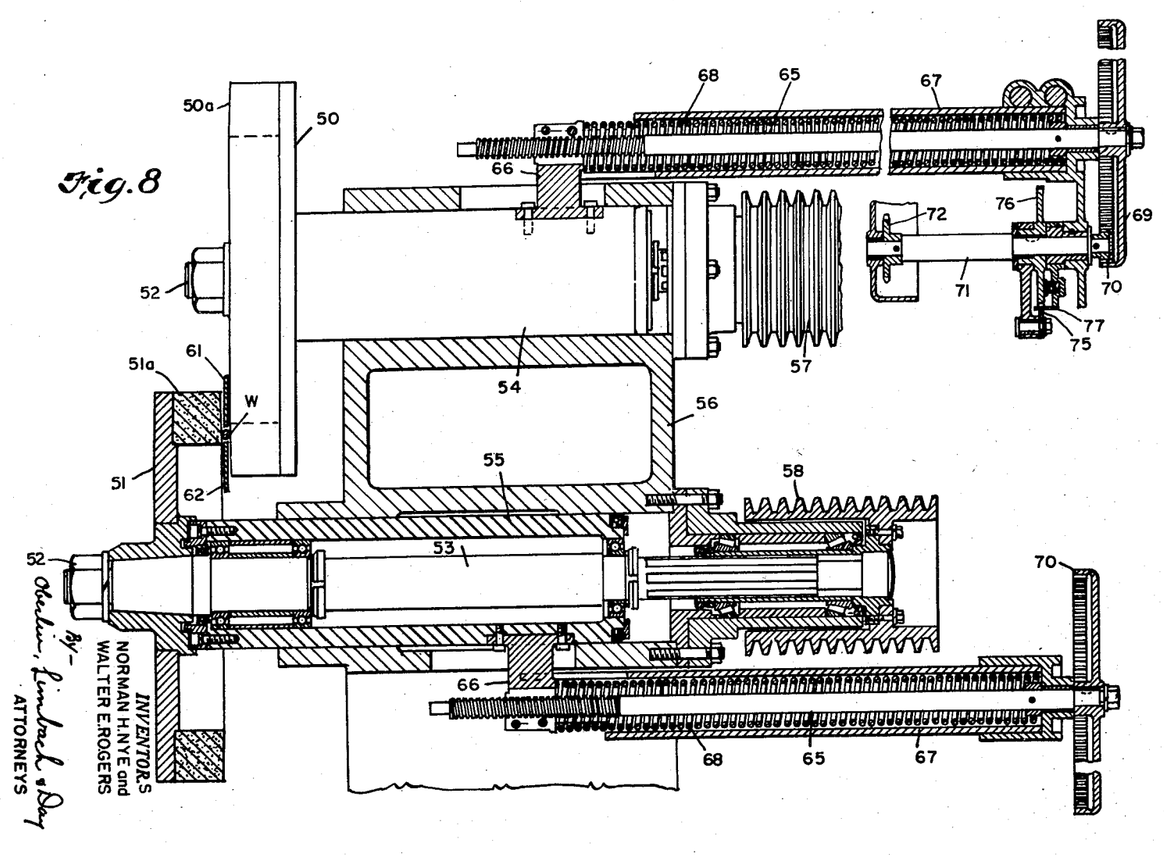
Fig. 8 is a vertical section of the grinding wheels which constitute the mechanical surface conditioning means of the illustrated apparatus, and of the mountings for such wheels, the plane of such section being indicated by the line 8—8 Figs. 1 and 2.

As shown on Figs. 1 and 2, the mechanical surface conditioning means B are desirably located immediately adjacent the oscillating device or mechanism which has just been described so that the longitudinally advancing work-piece or wire W will be oscillated to substantially its maximum extent where it is brought into contact with the grinding wheels 50 and 51 which constitute the specific surface conditioning means illustrated in the drawings (see Fig. 8). As there shown, such grinding wheels are rotatable about spaced axes disposed transversely and on opposite sides of the wire and have overlapping faces respectively adapted to contact the opposite sides of such wire as it passes therebetween. The grinding elements 50a and 51a of the respective wheels will consist of suitable abrasive material and desirably be of annular form as shown. Such annuli are firmly but detachably secured to the wheels so as to permit their replacement when worn down, such wheels comprising simply flat discs mounted on the ends of spindles 52 and 53 respectively. The latter are in turn rotatably carried by hollow slides 54 and 55 mounted for adjustment axially of the spindles in the main housing 56 of the surface conditioning mechanism or unit. The inner ends of the spindles, i. e., the ends opposite those to which the grinding wheels are attached, are splined or otherwise constructed to have sliding engagement with pulleys 57 and 58 respectively which are driven by the motor 6 (see Figs. 1 and 2). As there shown, the drive belt 59 (actually a plurality of V belts) is also passed around an idler pulley 60, the arrangement being such that pulleys 57 and 58, and thus the corresponding grinding wheels, will be rotated in opposite directions. As a result, the overlapping faces of the annular grinding members 50a and 51a which engage the wire W will travel in the same direction, such direction being that in which the wire itself travels. However, it is contemplated that under certain conditions it may be found preferable to have the engaging surfaces of the two wheels go in a direction opposite to that in which the wire travels, or one such member may go one way and the other the other. As will be readily understood, all that will be necessary to provide for such different directions of rotation of the grinding members in relation to the direction of travel of the wire W will be to change the manner in which belt 59 passes around the pulleys 57 and 58.

Plate-like guides 61 and 62 similar to the guides 12 and 13 employed in connection with the wobble rolls will desirably be provided to insure retention of the wire in proper alignment as it passes through between the overlapping faces of grinding members 50a and 51a. However, the employment of such guides is more by way of precaution against unexpected whipping of the wire than because of its displacement by the action of the annular grinding members, since due to the disposition of the axes of the latter and the engagement of the wire on a chordal line removed a substantial distance from such axes, in fact closely adjacent the outer peripheries of the grinding faces of the members, the movement of such faces will be in the main longitudinally and not crosswise of the wire.

Figure 13:
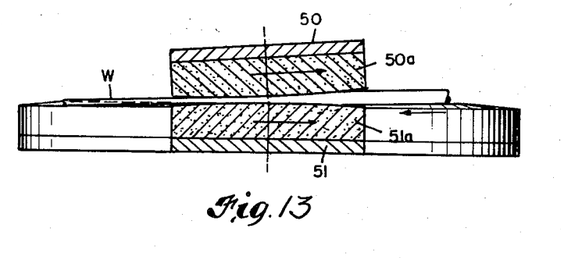
Fig. 13 is a sectional view of such grinding wheels and wire passing therebetween, the plane of the section being indicated by the line 13—13 Fig. 11 and the angles and curvatures shown being exaggerated for purposes of clear illustration.
Figure 14:
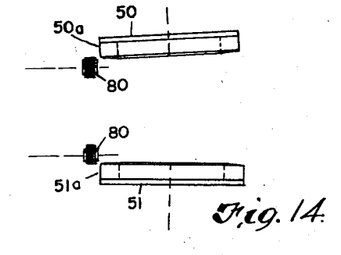
Fig. 14 is a top plan view of said grinding wheels and associated dressing wheels, said grinding wheels being separated out of position for purposes of illustration.

The foregoing relationship between the faces of the grinding wheels where they thus engage the wire is clearly shown in diagrammatic Fig. 11. As further shown in companion Figs. 12 and 14, the faces in question are given a slight bevel in a radially outward direction and the axes of the wheels instead of being strictly parallel are tilted slightly so as to incline the wheels towards each other along the chordal line where the wire is thus engaged. As a result, the space between such faces through which the wire travels will have the cross-sectional form shown in Fig. 13, i. e., such space will be widest where the unground wire enters, will then gradually narrow toward the mid-point and thence continue substantially uniform in width. Actually the opposed faces at such mid-point along the chordal line in question will be slightly rounded since the surfaces in question constitute conical frustra.

We have found that as a result of the foregoing form and disposition of the grinding wheels not only is the action of the latter greatly increased in efficiency, but a highly uniform product results. Not only will the finished wire be of uniform diameter, but the grinding action of the wheels will likewise be uniform, i. e., the surface will be ground away to a uniform depth all around the wire.

Figure 9:
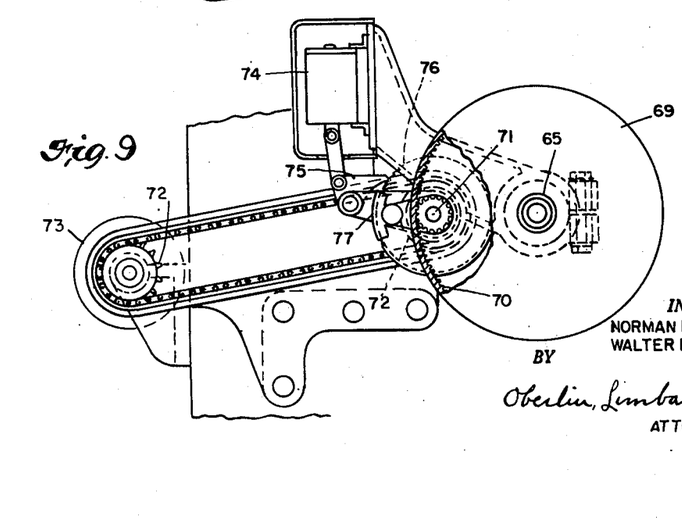
Fig. 9 is an end view of the adjusting means associated with one such grinding wheel mount, as viewed in the direction of the arrowed line 9—9 Fig. 8.

For the purpose of axially adjusting the spindles 52 and 53 which carry the grinding wheels, each of the corresponding slides 54 and 55 which carry such spindles is connected with a threaded shaft 65, through the medium of an internal threaded member or nut 66 which projects laterally from the corresponding slide. Said shaft is rotatably mounted in a tubular shell 67 which serves also to house a heavy compression spring 68 which presses against member 66 and thus takes up any backlash in the adjustment thereof. Mounted on the end of shaft 65 opposite to that which engages the member 66 is an internal gear 69 with which a pinion 70 carried by a parallel shaft 71 engages. While such shaft 71 is shown in Fig. 8 as lying in the same plane with the threaded shaft 65, it will actually be disposed to the rear of the latter since it would otherwise interfere with the adjacent drive pulley 57. Connected with shaft 71 by means of sprocket gearing 72 is a hand wheel 73 (see Fig. 9) whereby said shaft, and through it screw 65, may be rotated to adjust the axial position of the corresponding grinding wheel in either direction as desired. In addition to the provision thus made for manual adjustment of the grinding wheel, there is also shown in Figs. 8 and 9 an arrangement including a solenoid 74 whereby rotation of said shaft may be automatically effected to advance the corresponding grinding wheel toward the other wheel as the grinding faces thereof wear away. Any suitable form of measuring device adapted to calibrate the finished wire may be connected with such solenoid through a suitable relay circuit, so as to energize such solenoid whenever the diameter of the finished wire exceeds a predetermined maximum. The solenoid 74 when thus energized will in turn actuate a pawl 75 disposed to engage the teeth on a ratchet wheel 76 mounted on shaft 71, a movable shroud 77 associated with said wheel serving to limit the extent of movement thus imparted.

Figure 10:
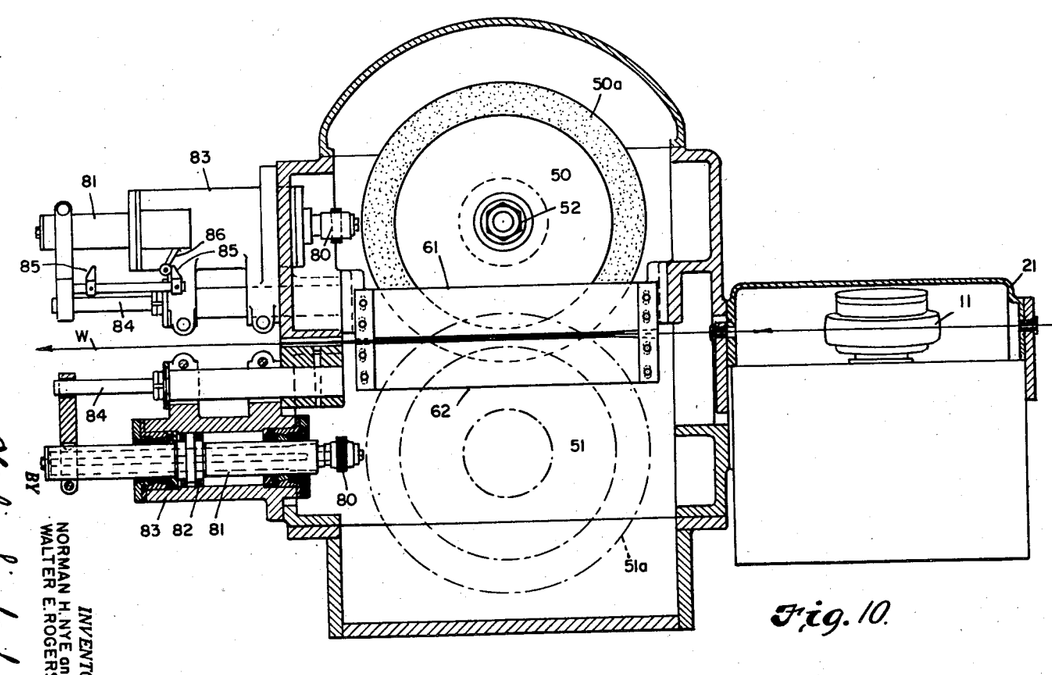
Fig. 10 is a sectional view showing the mechanism whereby the operating faces of the grinding wheels are dressed so as to maintain such faces of proper contour.

For the purpose of dressing the work-piece engaging faces of grinding members 50a and 51a as such faces become worn, we provide the mechanism shown in Fig. 10 which is adapted to perform such dressing operation without interrupting the operation of the apparatus as a whole. While various types of dressing tool may be employed, we prefer to use rotary multi-toothed cutters 80 as illustrated in the figure in question, one such cutter being provided in association with each grinding wheel. Each dressing tool is mounted, so as to be freely rotatable, on the end of a reciprocable plunger 81 which in effect constitutes the rod of a piston 82 reciprocable in a cylinder 83 to which pressure fluid may be supplied first to one end, then to the other, as desired, in order to move the dressing tool in or out as desired. An offset guide rod 84 serves to hold the piston rod 81 against rotation in the cylinder and steady its movement.

As will be seen upon reference to Fig. 10, the movement of the pistons 81 and thus of the dressing tools 80 is along substantially diametral lines of the corresponding grinding wheels. Actually, as shown in Figs. 10, 11 and 12, the lines along which the dressing tools are thus movable while lying in the diametral plane are inclined slightly to the axis of the corresponding grinding wheel so as to dress the work-engaging face thereof to the required bevel. The supply of pressure fluid to the cylinders 83 may be either manually or automatically controlled. In the latter case the dressing tools may be passed across the working faces of the grinding wheels at stated intervals. Otherwise the tools will be operated whenever observation of the finished stock indicates that dressing of the grinding wheels is required. In any case spaced stops 85 will desirably be carried along with each guide rod 84 in position to engage a lever 86 that controls the supply of pressure fluid to the corresponding cylinder so as to reverse such supply as the dressing tool reaches the limit of its stroke in each direction.

From the foregoing description of the construction and mode of operation of the several component parts, the operation of our improved surface conditioning apparatus as a whole should be readily apparent. Fig. 10 perhaps affords the best view of the essential parts of such apparatus in that in addition to the dressing mechanism just described the grinding wheels, as well as one of the wobble rolls which constitute the oscillating mechanism, are also shown. The length of the wire W operated upon by the mechanism is the continuously changing portion thereof which lies between the die 2 and winding drum 3 as such wire advances from supply to take-up. Such continuously moving length of wire will be rapidly torsionally oscillated by the action of the two opposed wobble rolls pressing thereagainst. The degree of such oscillation will be sufficient so that as the wire passes between the two grinding wheels 50 and 51 its entire circumferential surface will be brought into contact with the working faces of said wheels. The action of the latter in reducing the diameter of the wire has been fully set forth in connection with the description given above of the diagrammatic views, Figs. 1–4 inc. By dressing such working faces at intervals and properly adjusting the grinding wheels the diameter of the finished wire may be very accurately determined. It will be understood that in adjusting such wheels they will be simultaneously moved in opposite directions by equal amounts so that the wire passing between the working faces thereof will not be forced out of its proper path, i. e., its alignment will not be disturbed.

Our improved apparatus is not only adapted for continuous operation, i. e., for surface conditioning a wire strand of indefinite length without interruption, but also for very rapid operation. In other words, the wire may be passed through such surface conditioning apparatus at any speed compatible with the drawing operation involved in drawing it through die 2. It will be understood of course that use of the apparatus is not necessarily limited to association with such a drawing operation, but previously drawn wire or rod may be taken directly from a supply coil and passed through the apparatus provided a sufficient length thereof is left free between such guides as may be provided so as to permit the required torsional oscillation of such length.

The use of wobble rolls to oscillate the travelling work-piece has the decided advantage over any means heretofore proposed for such use that use of reciprocating parts is eliminated and at the same time a minimum of resistance is introduced to the free longitudinal movement of the work-piece. It will be understood that the term "grinding means" as employed herein is intended to connote any means regularly used to grind, smooth or polish metal surfaces. Likewise the term "wire" connotes not only ordinary wire strand, but rod and elongated work-pieces generally, particularly where of circular cross-section.

Other modes of applying the principle of our invention may be employed instead of the one explained, change being made as regards the means and the steps herein disclosed, provided those stated by any of the following claims or their equivalent be employed.

We therefore particularly point out and distinctly claim as our invention:

1. In mechanism of the character described work-piece oscillating means comprising two parallel spindles interconnected for rotation in the same direction and having ends inclined in the same direction to their respective axes, and rolls carried by said inclined ends disposed to grip the work-piece therebetween, said rolls having transversely convex faces.

2. In mechanism of the character described, work-piece oscillating means comprising two parallel spindles interconnected for rotation in the same direction and having ends inclined in the same direction to their respective axes, rolls carried by said inclined ends disposed to grip the work-piece therebetween, said rolls having transversely convex faces, and means adapted to adjust said spindles transversely of their axes.

3. In mechanism of the character described, work-piece oscillating means comprising two parallel spindles interconnected for rotation in the same direction and having ends inclined in the same direction to their respective axes, rolls carried by said inclined ends disposed to grip the work-piece therebetween, said rolls having transversely convex faces, and guides located between said rolls on opposite sides of the path of travel of such work-piece.

4. In mechanism of the character described, workpiece oscillating means comprising a drive shaft, two spindles disposed in parallel relation to said shaft and intergeared therewith, said spindles having ends inclined in the same direction to their respective axes, bearings for said spindles adjustable in an arc concentric with said shaft, and rolls carried by said inclined ends disposed to grip the work-piece therebetween, said rolls having transversely convex faces.

5. In apparatus for surface conditioning wire and the like, means adapted continuously to advance such wire longitudinally and oscillate the same about its axis, and grinding means comprising grinding wheels having overlapping faces respectively adapted to contact opposite sides of such advancing and oscillating wire as it passes therebetween, said wheels being rotatable about spaced axes disposed transversely of and on opposite sides of such wire and having the overlapping portions of their faces bevelled in a radially outward direction, such axes of said wheels being slightly inclined relative to each other to bring into substantial parallelism the portions of such bevelled faces along the portion of the chordal line traversed by such advancing wire as it travels from the midway point of such overlapping portions to the edges thereof.

6. In apparatus for surface conditioning wire and the like, means adapted continuously to advance such wire from supply to take-up, opposed rolls adapted to engage such wire intermediate said supply and take-up means, means adapted to rock the wire-engaging faces of said rolls relative to each other and transversely of such wire to oscillate such wire therebetween about its longitudinal axis, and mechanical surface conditioning means adapted to contact such oscillating wire.

7. In apparatus for surface conditioning wire and the like, means adapted continuously to advance such wire from supply to take-up, opposed rolls adapted to engage such wire intermedite said supply and take-up means, means adapted to rock said rolls relative to each other and transversely of such wire to oscillate such wire therebetween about its longitudinal axis, and grinding means adapted to contact such oscillating wire, said rocking means being adapted to rock said rolls to impart a degree of oscillation to such wire sufficient to ensure contact of the entire peripheral surface of said wire with said grinding means.

8. In apparatus for surface conditioning wire and the like, means adapted continuously to advance such wire from supply to take-up, opposed rolls having convexly curved transverse surfaces adapted to engage such wire therebetween at a point intermediate said supply and take-up means, means adapted to rock said rolls relative to each other about the centers of such convex curves and transversely of such wire to oscillate such wire therebetween about its longitudinal axis, and mechanical surface conditioning means adapted to contact such oscillating wire.

9. In mechanism of the character described, work-piece oscillating means comprising two spindles interconnected for synchronized rotation, and rolls journalled on each of said spindles with their axes of rotation inclined to the respective axes of rotation of said spindles, the faces of said rolls being relatively positioned to engage such workpiece therebetween.

10. In apparatus for surface conditioning wire and the like, means adapted continuously to advance such wire longitudinally and simultaneously oscillate the same about its axis, means including rotatable grinding wheels having faces respectively adapted to contact opposite sides of such advancing and oscillating wire as it passes therebetween for performing the major reduction of the diameter of said wire in the first half of its passage between said faces and further reducing said wire to a lesser degree in the second half of its passage between said faces, said wheels being rotatable about axes disposed transversely of such wire and having the work-contacting portions of their faces bevelled, guide means arranged to direct such wire between said wheels along a chordal line adjacent the peripheries thereof, such axes of said wheels being relatively inclined to bring more closely together the bevelled faces of said wheels along the second half of such chordal line and to present converging grinding surfaces adapted to move predominately longitudinally of such wire along the first half of such chordal line.

NORMAN H. NYE.
WALTER E. ROGERS.

REFERENCES CITED

The following references are of record in the file of this patent:

UNITED STATES PATENTS

| Number | Name | Date |
| --- | --- | --- |
| 153,677 | Illingworth | Aug. 4, 1874 |
| 1,111,254 | French et al. | Sept. 22, 1914 |
| 1,116,557 | Brightman | Nov. 10, 1914 |
| 1,505,282 | Nevill | Aug. 19, 1924 |
| 2,105,637 | Davis | Jan. 18, 1938 |
| 2,209,711 | Young | July 30, 1940 |
| 2,355,174 | Nye et al. | Aug. 8, 1944 |